July 31, 1956     M. L. BRIER     2,757,013
HANDLE MOUNTING FOR LAWN MOWERS AND OTHER IMPLEMENTS
Filed Jan. 19, 1954
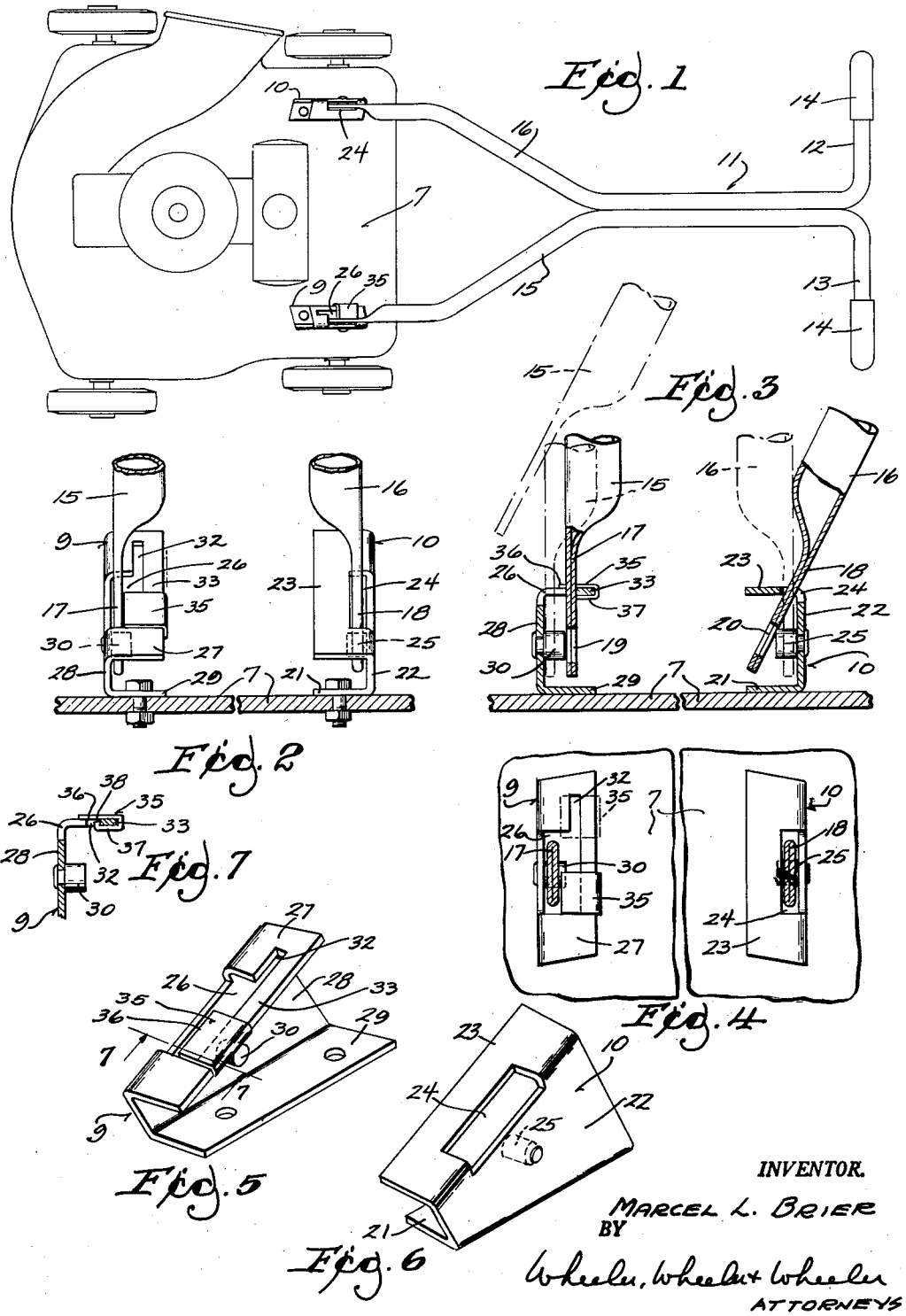
INVENTOR.
MARCEL L. BRIER
BY
Wheeler, Wheeler & Wheeler
ATTORNEYS United States Patent Office 2,757,013
Patented July 31, 1956

2,757,013

HANDLE MOUNTING FOR LAWN MOWERS AND OTHER IMPLEMENTS

Marcel L. Brier, Peterborough, Ontario, Canada, assignor, by mesne assignments, to Outboard, Marine & Manufacturing Company, Waukegan, Ill., a corporation of Delaware Application January 19, 1954, Serial No. 405,008

4 Claims. (Cl. 280—47.37)

This invention relates to a handle mounting for lawn mowers and other implements.

The body of the implement is provided with slotted brackets to receive the apertured ends of a bifurcated handle. Each bracket has a pin receivable in the aperture of one of said ends after the end has been thrust through the slot. In the case of one of the brackets the handle end must be tilted to manipulate it through the slot and onto the pin. In the case of the other bracket there is a lateral widening of the slot so that the handle end may pass directly therethrough free of the pin. However, this latter bracket has a slide which may be retracted when the handle is being attached or removed but which advances from its retracted position to a restraining position in which it functions as a keeper to preclude disengagement of the handle implement from the pin.

In the drawings:

Fig. 1 is a plan view of a lawn mower exemplifying the application of a handle in accordance with the invention.

Fig. 2 is an enlarged detail view of the handle brackets and fragments of the handle as they appear in rear elevation.

Fig. 3 is a view of the handle brackets in transverse section, portions of the handle being illustrated in full and dotted lines in various positions of manipulation.

Fig. 4 is a view of the handle brackets in plan, portions of the handle being shown in horizontal section.

Fig. 5 is a view in perspective of the handle bracket provided with a keeper.

Fig. 6 is a view in perspective of the handle bracket which does not require a keeper.

Fig. 7 is a fragmentary detail view taken in section on the line 7—7 of Fig. 5.

It will be understood that the illustration of the lawn mower is merely by way of exemplification, since there are other appliances to which handles may be removably mounted in accordance with the invention. The lawn mower chosen as representative comprises a wheeled frame 7 having brackets 9 and 10 which are separately illustrated in Figs. 5 and 6. The handle 11 is also merely representative. As shown it comprises a pair of tubes intermediately welded together and having divergent ends 12 and 13 with grips 14. The handle portions 15, 16 are mutually divergent, the handle being bifurcated for engagement independently with the respective brackets 9 and 10. The divergent legs of the handle have flattened ends 17, 18 transversely pierced as best shown at 19, 20 in Fig. 3.

The bracket 10 is generally wedge shaped in side elevation. It is basically a stamping having a flange 21 that rests on the wheel frame of the appliance. This supports an upright plate at 22 which has a top flange 23 which, for the purposes of this particular type of appliance, is rearwardly sloped. A slot is provided at 24 to receive the flattened end portion 18 of the leg 16 of the handle. When the handle is tilted slightly to the side the end portion 18 may be manipulated through the slot 24 as shown in Fig. 3 to clear the peg 25 which is mounted in the side wall 22 of the bracket 10. When aperture 20 registers with peg 25, the handle may be straightened up to the position shown in dotted lines in Fig. 3 to engage peg 25 in its aperture 20 thereby pivotally connecting the flattened portion 18 of leg 16 to bracket 10.

When the handle is erected, as above described, the flattened portion 17 of leg 15 passes through the slot 26 in the top wall 27 of bracket 9 in the position shown in full lines in Fig. 3. Bracket 9 is a left handed counterpart of bracket 10, being similarly provided with a peg 30 which projects inwardly from its side wall 28, the latter being supported by flange 29 from the mower frame. The slot 26, however, is wider than slot 24 so that the handle portion 17 need not be manipulated in a tilting direction to clear the peg or stud 30.

The widened portion of slot 26, which permits the handle to clear the peg while upright, is also elongated upwardly of flange 27 as shown at 32 in Fig. 5. Clamped about the marginal portion 33 of flange 27 is a slide 35 of channel shaped section as shown in Fig. 3. Its upper flange 36 extends over a portion of slot 26 to reduce the width of the slot substantially to the width of slot 24 in the right hand bracket 10. The lower flange 37 of the slide 35 has its margin 38 offset into the slot to engage the inner margin of the strip 33 of the bracket, whereby to maintain the slide in engagement thereon (see Fig. 7). The increased length of slot 26 provided by extension 32 is sufficient to accommodate the slide in the dotted line position shown in Fig. 4 so that, with the slide thus elevated, the flattened portion 18 of leg 15 of the handle is freely receivable through the slot 26. However, with the leg portion 15 of the handle slightly spread as shown in full lines in Fig. 2 and in dotted lines in Fig. 3, to engage the peg 30 in the aperture 19, the slide 35 may then be restored to the position shown in full lines in Figs. 2, 4 and 5, in which position, as best shown in Fig. 4, the leg of the handle is securely anchored on peg 30. This also anchors the leg 18 of the handle securely on peg 25.

The length of the slots 24 and 26 provided by the respective brackets is such as to permit to the handle any desired degree of pivotal movement of the pegs 25 and 30 respecting the mower.

While accidental separation of the handle from the mower is impossible, any desired removal of the handle may be accomplished almost instantly by raising the slide 35 to the position shown in Fig. 4, springing the handle leg 15 free of the peg 30, withdrawing such leg from slot 26 by laterally tilting the handle and thereupon withdrawing leg 16 from slot 24, it having been disengaged from peg 25 by the lateral tilting aforesaid.

I claim:

1. In a device of the character described the combination with a bifurcated handle having spaced legs provided with holes, of individual brackets having wall portions slotted to receive the legs, and having pegs projecting beneath their respective slots for engagement in the holes of the legs, the slot of one bracket being too narrow to permit engagement or disengagement of the handle leg over the peg except upon tilting manipulation of the leg respecting the bracket, the slot of the other bracket being sufficiently wide to receive the leg in a plane beyond the peg and having a restricting detent adjustably mounted on the bracket and movable to and from a slot restricting position of engagement with said leg for retention thereof on the peg.

2. In a device of the character described, the combination with a handle having a leg portion provided with a transverse aperture, of a bracket having a slotted flange projecting laterally therefrom and a peg spaced beneath said flange and projecting laterally from the bracket in the same general direction as said flange to a distance less than the total width of the slot, the slotted flange comprising means to receive and laterally confine the leg portion in a position clearing the end of the peg, the peg being receivable into the aperture of the handle leg portion upon lateral movement of the leg portion in the slot, the bracket having detent means mounted thereon for movement across the path of disengagement of said leg portion from the peg when the handle leg portion is so engaged, said detent means engaging the side of said leg portion in a direction to preclude its disengagement from the peg.

3. The device of claim 2 in which the detent means comprises a slide mounted on the flange to partially overlap the slot, the length of the slot in the flange being sufficient to accommodate movement of said slide to a retracted position wherein the portion of the slot above the peg is open to accommodate insertion and removal of the leg portion free of the peg, said slide having an advanced position in which said detent means is over said peg and is laterally engaged with the leg portion and in which the effective width of the slot portion above the peg is so reduced as to preclude lateral disengagement of the leg portion from the peg.

4. A device of the character described comprising right and left hand brackets each comprising a base, an upright and an overhanging flange provided with a slot, said brackets having oppositely projecting pegs spaced beneath their respective slotted flanges, and a bifurcated handle having apertured legs engaged pivotally on the respective pegs, the slot of one of said brackets having a width exceeding the projection of the peg by a distance sufficient to accommodate insertion and removal of the corresponding handle leg free of the peg, said last mentioned bracket having a strap portion bounding said slot, and a slide reciprocably mounted on said strap portion between a leg obstructing position in which the leg is laterally confined by the peg and a retracted position leaving said slot free for leg insertion and lateral removal clear of said peg.

References Cited in the file of this patent

UNITED STATES PATENTS

| | | |
|---|---|---|
| 1,053,829 | Keith | Feb. 18, 1913 |
| 1,655,174 | White | Jan. 3, 1928 |
| 1,795,031 | McCurdy | Mar. 3, 1931 |